United States Patent
Deng et al.

(10) Patent No.: US 7,817,656 B1
(45) Date of Patent: Oct. 19, 2010

(54) FIBRE-CHANNEL OVER-SUBSCRIPTION OVER DWDM/SONET/SDH OPTICAL TRANSPORT SYSTEMS

(75) Inventors: Yu Deng, Milpitas, CA (US); Fan Zhou, Petaluma, CA (US); Sharat Prasad, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 40 days.

(21) Appl. No.: 12/400,477

(22) Filed: Mar. 9, 2009

Related U.S. Application Data

(63) Continuation of application No. 10/366,867, filed on Feb. 13, 2003, now abandoned.

(51) Int. Cl.
*H04L 12/02* (2006.01)
(52) U.S. Cl. .................................. 370/412
(58) Field of Classification Search ............. 370/412, 370/415, 416
See application file for complete search history.

(56) References Cited

U.S. PATENT DOCUMENTS

| | | | |
|---|---|---|---|
| 5,610,745 A | 3/1997 | Bennett | |
| 5,638,518 A | 6/1997 | Malladi | |
| 6,014,237 A | 1/2000 | Abeles et al. | |
| 6,393,489 B1 | 5/2002 | Sambamurthy et al. | |
| 7,391,728 B2 * | 6/2008 | Natarajan et al. | 370/235 |
| 2003/0016683 A1 | 1/2003 | George et al. | |
| 2003/0091037 A1 | 5/2003 | Latif et al. | |
| 2003/0120705 A1 | 6/2003 | Chen et al. | |
| 2004/0081108 A1 | 4/2004 | Kloth et al. | |

FOREIGN PATENT DOCUMENTS

WO 0143328 A1 6/2001

OTHER PUBLICATIONS

"Fibre Channel Switch Fabric (FX-SW) Rev. 3.3" NCITS Working Draft Proposed American National Standard for Information Technology, Oct. 21, 1997.
"Fibre Channel Switch Fabric—2 (FC-SW-2) Rev. 5.3" NCITS Working Draft Proposed American National Standard for Information Technology, Jun. 26, 2001.
"Fibre Channel Framing and Signaling (FC-FS), Rev. 1.70," NCITS Working Draft Proposed American National Standard for Information Technology, Feb. 8, 2002.

* cited by examiner

*Primary Examiner*—Melvin Marcelo

(57) ABSTRACT

Fiber-Channel links are carried over transport networks such as optical transport networks. In certain embodiments, available transport network capacity is over-subscribed by Fiber-Channel links. This may be accomplished by buffering Fiber-Channel traffic at the ingress of the transport network and selecting frames to inject into the transport network from the buffers. Transport network efficiency can therefore be greatly increased by use of statistical multiplexing. Ready signals from the receiving Fiber-Channel ports may be delayed before being relayed to the transmitting Fiber-Channel ports.

13 Claims, 5 Drawing Sheets

FIBRE-CHANNEL OVER-SUBSCRIPTION OVER DWDM/SONET/SDH OPTICAL TRANSPORT SYSTEMS

STATEMENT OF RELATED APPLICATIONS

This application is a continuation of U.S. patent application Ser. No. 10/366,867, filed on Feb. 13, 2003, now abandoned which in turn is related to the subject matter of U.S. patent application Ser. No. 10/166,213, entitled "INTELLIGENT FLOW CONTROL MANAGEMENT TO EXTEND FIBRE-CHANNEL LINK FULL PERFORMANCE RANGE," filed on Jun. 10, 2002, the entirety of which is incorporated herein by reference.

BACKGROUND OF THE INVENTION

The present invention relates to data networking, telecommunication networking, and, in one embodiment, to systems and methods for efficiently aggregating multiple Fibre-Channel links.

The Fibre-Channel standard defines a bi-directional link protocol, used to connect computers to disk drives and other peripherals. A typical Fibre-Channel link may have a bandwidth of 1063 Mbps and a span of up to 10 kilometers.

One typical application of Fibre-Channel is interconnecting computer CPUs with arrays of disk drive in large scale computing centers, as would be used in, e.g., financial transaction processing. For reasons of fault tolerance, it is desirable to locate redundant storage resources at remote locations. The advent of high data rate metropolitan optical networks including such networks based on the use of dense wave division multiplexing (DWDM) and/or SONET/SDH transport systems makes it possible to extend so-called storage area networks (SANs) that carry multiple Fibre-Channel links over distances much longer than 10 kilometers.

It is useful to apply the widely prevalent Fibre-Channel standard to communicate across DWDM networks and therefore minimize the need to redesign computing center equipment. Such DWDM networks can themselves employ protocol such as Gigabit Ethernet, 10 Gigabit Ethernet, SONET, etc. A single wavelength may thus carry e.g., a 1 Gbps, 10 Gbps data stream, etc. Fibre-Channel frames may be encapsulated within Gigabit Ethernet frames and/or SONET frames.

However, severe data transport inefficiencies may arise if Fibre-Channel links are assigned to, e.g., Gigabit Ethernet links, 10 Gigabit Ethernet links, or STS-48 SONET envelopes based on maximum Fibre-Channel throughput. Typically, the momentary aggregate bandwidth of the Fibre-Channel links will fall far short of the total of the maximum bandwidths. Therefore, a straightforward mapping of transport network capacities to maximum Fibre-Channel demands will result in unused capacity. It would be desirable to use capacity more efficiently and therefore reduce costs.

One way of providing Fibre-Channel over-subscription of transport network capacity is to use Fibre-Channel switches on each end. This scheme is, however, much more expensive and adds complexity relating to management of the Fibre-Channel switch equipment. And furthermore this scheme represents only a partial solution since certain scenarios cannot be accommodated.

SUMMARY OF THE INVENTION

Fibre-Channel links are carried over transport networks such as optical transport networks. In certain embodiments, available transport network capacity is over-subscribed by Fibre-Channel links. This may be accomplished by buffering Fibre-Channel traffic at the ingress of the transport network and selecting frames to inject into the transport network from the buffers. Transport network efficiency can therefore be greatly increased by use of statistical multiplexing. Ready signals from the receiving Fibre-Channel ports may be delayed before being relayed to the transmitting Fibre-Channel ports.

A first aspect of the present invention provides a method for operating a transport interface to a plurality of local Fibre-Channel ports. The method includes: providing a plurality of buffers corresponding to the plurality of local Fibre-Channel ports, receiving frames for transmission to remote Fibre-Channel ports from the local Fibre-Channel ports, queueing the frames in the plurality of buffers, selecting a next frame for transmission into a transport network from the buffers, and transmitting the selected next frame via the transport network.

A second aspect of the present invention provides apparatus for operating a transport interface to a plurality of local Fibre-Channel ports. The apparatus includes: a plurality of buffers corresponding to the plurality of local Fibre-Channel ports, wherein frames output by the plurality of local Fibre-Channel ports are queued into associated ones of the plurality of buffers, and a selector that selects a next frame for transmission into a transport network from the plurality of buffers.

Further understanding of the nature and advantages of the inventions herein may be realized by reference to the remaining portions of the specification and the attached drawings.

DESCRIPTION OF SPECIFIC EMBODIMENTS

The present invention will be described with reference to a representative application where two or more Fibre-Channel links are tunneled through a transport network. In one particular implementation, the transport network is implemented as a metropolitan optical network. Fibre-Channel frames are transported through the network encapsulated within packets such as Ethernet packets. Optical network details and the encapsulation details are not germane to the description of the present invention but it will be appreciated that Ethernet packets, e.g., may be carried on optical signals modulated with e.g., 1 Gbps, 2.5 Gbps, or 10 Gbps data waveforms. Also, SONET frames may be used, e.g., instead of Ethernet packets. Multiple optical signals also may share the same fiber by use of wavelength division multiplexing (WDM) techniques.

According to embodiments of the present invention, two or more Fibre-Channel links may be multiplexed together over a single transport link such as a Gigabit Ethernet channel, 10 Gigabit Ethernet channel, etc. The combined maximum data rates of the Fibre-Channel links may exceed the momentary bandwidth of the transport link. For example, two 1 Gbps Fibre-Channel links may share the same Gigabit Ethernet channel. This is possible because the Fibre-Channel links do not always operate at their maximum data rate. Thus, statistical multiplexing exploits the relatively low probability that at any particular moment the aggregate Fibre-Channel bandwidth demand will exceed the transport link capacity.

Figure 1:
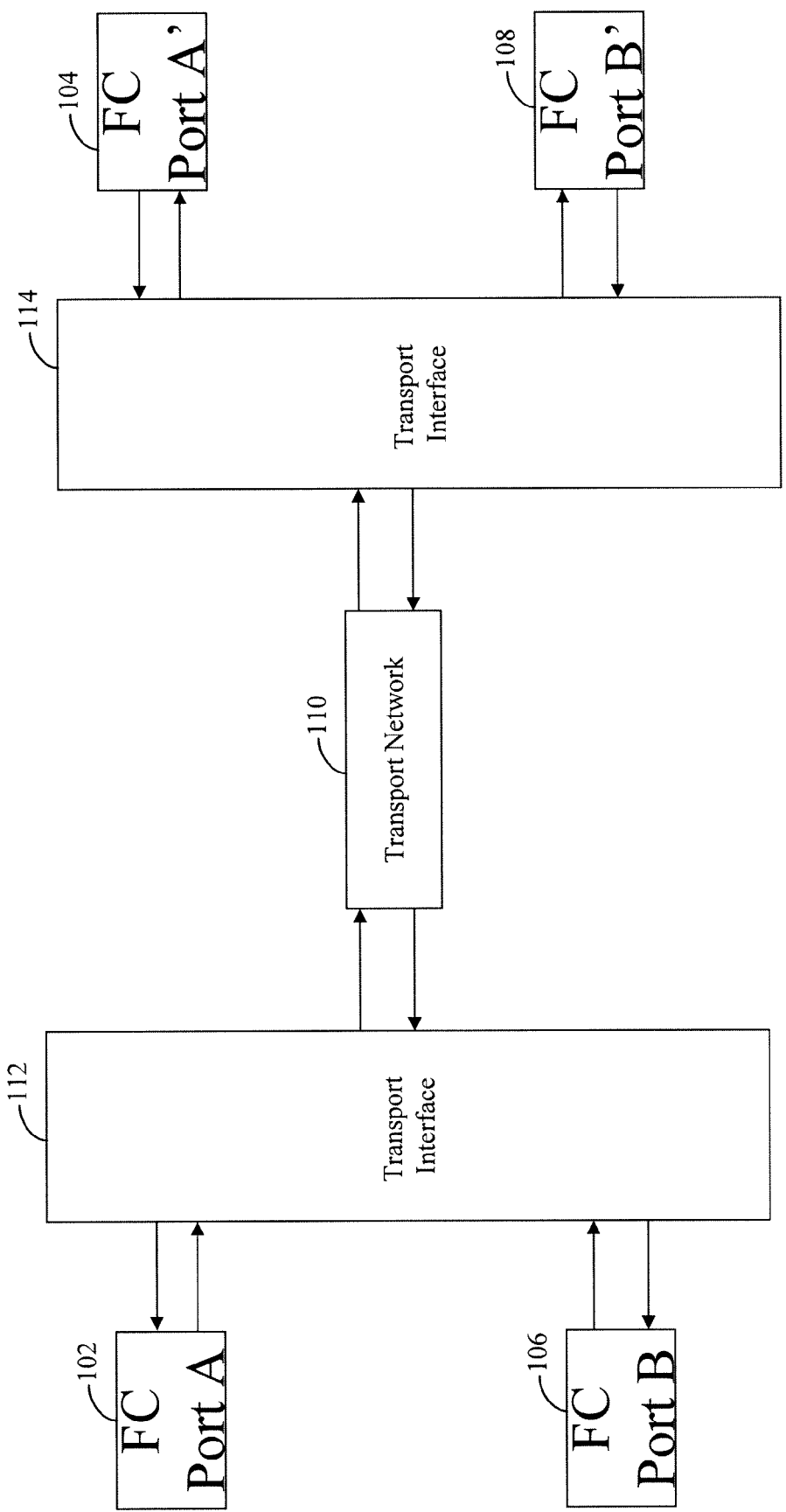
FIG. 1 depicts two Fibre-Channel links employing a transport network according to one embodiment of the present invention.

FIG. 1 depicts two Fibre-Channel links that are carried through a transport network via transport interfaces according to one embodiment of the present invention. A first Fibre-Channel link interconnects Fibre-Channel port A 102 and Fibre-Channel port A' 104. A second Fibre-Channel link connects Fibre-Channel port B 106 and Fibre-Channel port B' 108. The Fibre-Channel ports of each link exchange data and control signals in accordance with the Fibre-Channel standard as described in, e.g., "Fibre-Channel Framing and Signaling (FC-FS), Rev 1.70," NCITS Working Draft Proposed American National Standard for Information Technology, Feb. 8, 2002, the contents of which are herein incorporated by reference in their entirety for all purposes. The Fibre-Channel ports 102, 104, 106, and 108 may provide connectivity to devices such as, e.g., disk drives, disk storage arrays, magnetic tape drives, processing units, printers, etc.

A transport network 110 carries the two Fibre-Channel links which as noted above may be combined into the same transport link. The Fibre-Channel frames may be encapsulated within packets or frames appropriate to the transport network structure such as Ethernet packets, SONET frames, etc. The Fibre-Channel ports 102, 104, 106, and 108 are connected to the transport network 110 via transport interfaces 112 and 114. Transport interfaces 112 and 114 encapsulate and de-encapsulate Fibre-Channel frames. They also, as will be explained, perform functions that make it possible for the two Fibre-Channel links to share a single transport link.

Figure 2:
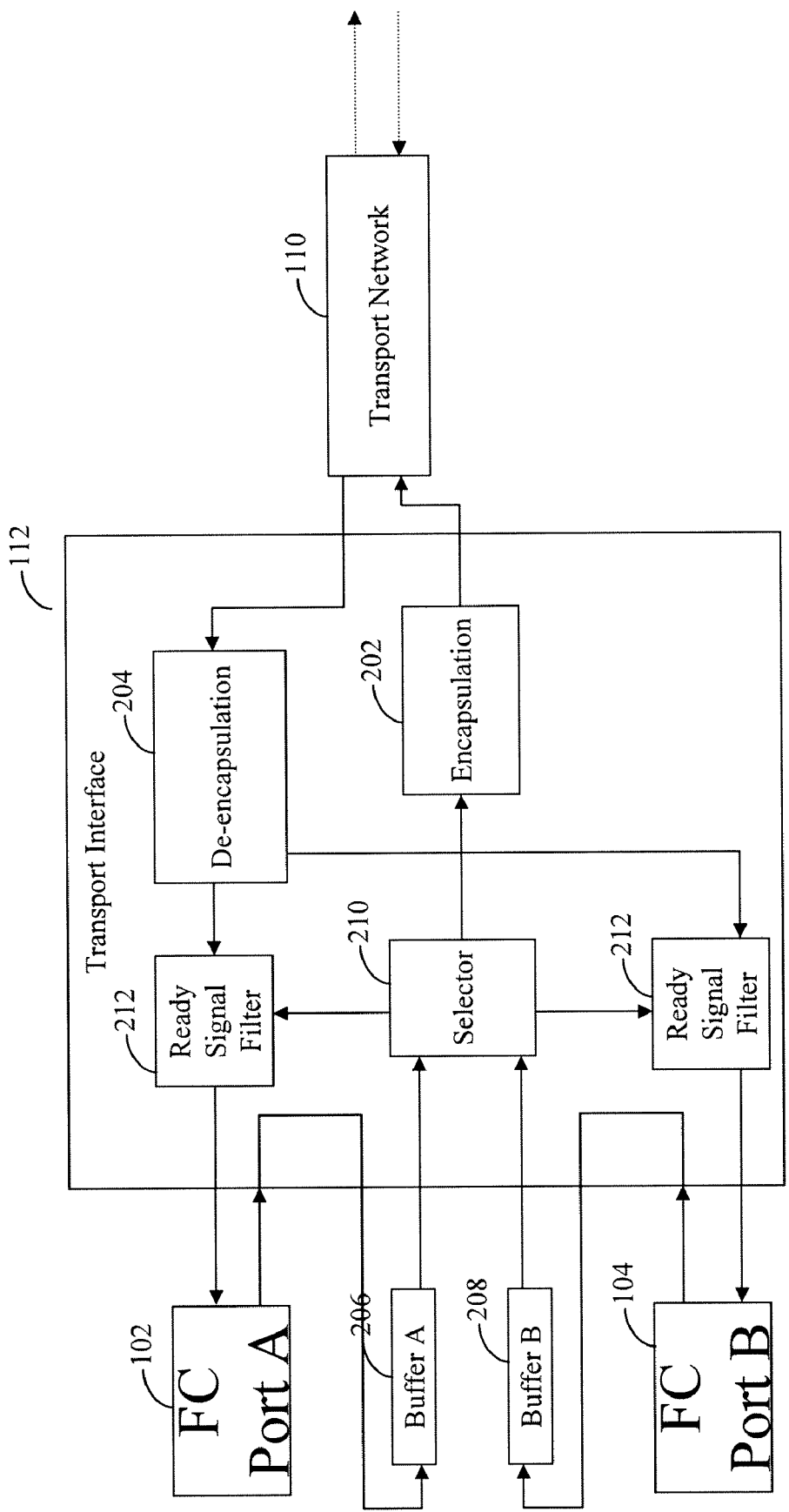
FIG. 2 depicts further details of a transport interface for coupling Fibre-Channel ports to a transport network according to one embodiment of the present invention.

FIG. 2 depicts details of transport interface 112 according to one embodiment of the present invention. Encapsulation of Fibre-Channel frames into transport network packets or frames is handled by an encapsulation block 202. A de-encapsulation block 204 removes Fibre-Channel frames from the transport network packet or frames. Prior to encapsulation and transmission, Fibre-Channel frames to be transmitted are stored in buffer A 206 and buffer B 208 which correspond to their associated Fibre-Channel ports. A selector 210 picks the next frame for transmission from buffers 206 and 208.

To prevent overflow of a remote Fibre-Channel port's internal buffers, Fibre-Channel provides a flow control mechanism that exploits credits. Each credit signifies the remote Fibre-Channel port's capacity to accept a new frame. Credits are issued by the recipient to the sender. When the Fibre-Channel link is established each port sends an initial buffer_to_buffer credit value to the other port. For each frame sent, the sender decrements the buffer_to_buffer credit by one. A new credit is issued by sending a receive ready indication, "R_RDY" from the receiver to the sender. The sending port increments the buffer_to_buffer credit by one for each ready indication it receives. In accordance with embodiments of the present invention, these received ready signals are throttled by ready signal filters 212. Received ready signals are held by the filter until a frame from the associated buffer has been transmitted. Then the ready signal is released and relayed to the appropriate Fibre-Channel port.

Except for this throttling of the received ready signals, transport interface 112 is seen by Fibre-Channel port A 102 and Fibre-Channel port B 106 as essentially transparent. The Fibre-Channel ports operate in accordance with normal Fibre-Channel protocols and transmit and receive Fibre-Channel data and control signals. At the local Fibre-Channel port, if the number of transmitted Fibre-Channel frames reaches the buffer_to_buffer credit number before receipt of any ready signals, additional frame transmission will be stopped. By throttling the transmission of ready signal indications from transport interface 112, one assures that the maximum number of buffered Fibre-Channel frames in the buffers 206 and 208 is the buffer_to_buffer credit number that was set by the remote Fibre-Channel port. If buffers 206 and 208 are made sufficiently large, they will not be overrun and there will be no loss of Fibre-Channel frames through the transport network.

Figure 3:
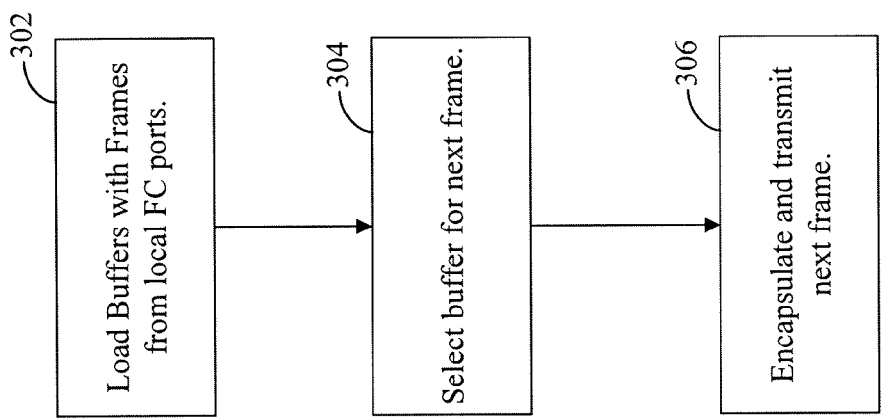
FIG. 3 is a flow chart describing steps of preparing Fibre-Channel frames for ingress into the transport network according to one embodiment of the present invention.

FIG. 3 describes operation of transport interface 112 according to one embodiment of the present invention. A step 302 involves the loading of buffers 206 and 208 with frames output by Fibre-Channel ports 102 and 106, respectively. Buffers 206 and 208 are essentially FIFO queues. Selector 210 selects a next frame for transmission from one of the buffers 206 and 208 at step 304. Any suitable queuing algorithm may be used to determine which buffer to select from.

For example, Deficit-Weighted Round Robin queuing may be used. In a deficit-weighted round robin implementation each transmitting port has a quantum value associated with it. This quantum value defines how much relative weight (or percentage of available capacity) each port has. The steps for the deficit-weighted round robin algorithm are as follows:

1. Keep a quantum DeficitCounter per receive port queue. Initialize DeficitCounters to 0.
2. Specify the Maximum Transmit Unit (MTU), i.e. the maximum frame size.
3. Calculate quantum=weight*MTU for both Fibre-Channel ports. The weight is 1 for both Fibre-Channel ports if the bandwidth allocation is to be equal but the weights may be adjusted to provide higher bandwidth to a particular Fibre-Channel port.
4. Select a non-empty buffer in round-robin manner and update its DeficitCounter with DeficitCounter=quantum+DeficitCounter.
5. De-queue frames from this buffer so long as the DeficitCounter−number of de-queued bytes>0 or all other buffers are empty. If this buffer becomes empty reset its DeficitCounter to 0.
6. Repeat steps 5 and 6.

Other methods of queuing such as round robin, etc., or any suitable queuing method may be used to implement selecting step 304. At step 306, the frame selected by selector 210 is encapsulated by encapsulation block 202 and transmitted via transport network 110.

Received packets and frames are handled by de-encapsulation block 204. De-encapsulation block 204 extracts the Fibre-Channel frame and forwards it toward the particular Fibre-Channel port identified in the encapsulation header. Fibre-Channel data frames and most control frames are simply forwarded directly to the appropriate Fibre-Channel port. However, ready signal indications are throttled by ready signal filters 212.

Figure 4:
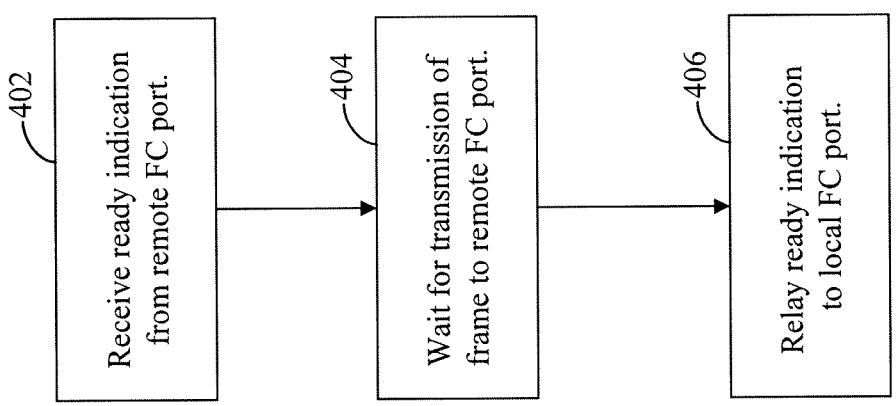
FIG. 4 is a flow chart describing steps of processing a Fibre-Channel ready indication received from a remote Fibre-Channel port according to one embodiment of the present invention.

FIG. 4 is a flow chart describing steps of the operation of ready signal filters 212 according to one embodiment of the present invention. At step 402, the ready indication is received from the remote Fibre-Channel port. Instead of being immediately relayed, at step 404 ready signal filter 212 waits for transmission of a frame from the buffer associated with the Fibre-Channel port to which the ready signal is targeted. This occurs when selector 212 de-queues a frame for transmission.

Once this occurs, at step 406, the ready indication is relayed to the associated Fibre-Channel port.

To further facilitate exploitation of spare bandwidth, the present invention provides for special handling of Fibre-Channel idle frames. When a Fibre-Channel link is not busy carrying data or control information, it is carrying idle frames. In accordance with embodiments of the present invention, these are filtered out at the ingress transport interface to free up transport link capacity that can be filled by one or more busy Fibre-Channel links. The egress transport interface regenerates these idle frames when it detects a gap in traffic on a particular link.

Network Device Details

Figure 5:
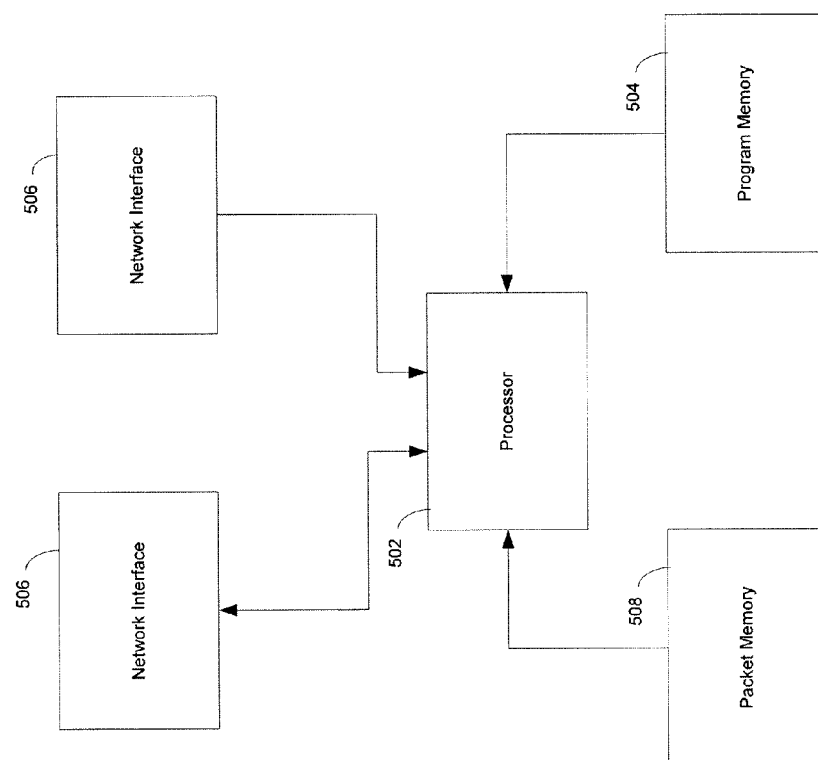
FIG. 5 depicts a network device useful in implementing embodiments of the present invention.

FIG. 5 depicts a network device 500 that may be used to implement, e.g., the transport network interface of FIG. 2 and/or perform any of the steps of FIGS. 3-4. In one embodiment, network device 500 is a programmable machine that may be implemented in hardware, software or any combination thereof. A processor 502 executes code stored in a program memory 504. Processor 502 may perform the encapsulation, de-encapsulation, and flow control operations described above. Program memory 504 is one example of a computer-readable storage medium. Program memory 504 can be a volatile memory. Another form of computer-readable storage medium storing the same codes would be some type of non-volatile storage such as floppy disks, CD-ROMs, DVD-ROMs, hard disks, flash memory, etc. A carrier wave that carries the code across a network is another example of a computer-readable storage medium.

Network device 500 interfaces with physical media via a plurality of line cards 506. For example, one of line cards 506 may couple to an optical fiber and may incorporate appropriate physical and link layer functionality. In one implementation, there may be a line card for supporting transport links and another line card for connecting to local Fibre Channel ports. The line card for supporting transport links may incorporate a Gigabit Ethernet interface, 10-Gigabit Ethernet interface, a SONET interface, etc. As packets are received, processed, and forwarded by network device 500, they may be stored in a packet memory 508. Packet memory 508 may serve to implement buffers such as buffers 206 and 208. Network device 500 implements all of the network protocols and extensions thereof described above as well as the data networking features provided by the present invention.

It is understood that the examples and embodiments that are described herein are for illustrative purposes only and that various modifications and changes in light thereof will be suggested to persons skilled in the art and are to be included within the spirit and purview of this application and scope of the appended claims and their full scope of equivalents. For example, any number of Fibre-Channel links may be over-subscribed to a transport network link.

The invention claimed is:

1. A method comprising:
   at a transport interface to a plurality of local Fibre-Channel ports, providing a plurality of buffers corresponding to said plurality of local Fibre-Channel ports;
   at the plurality of local Fibre-Channel ports, receiving frames for transmission to remote Fibre-Channel ports from said local Fibre-Channel ports;
   queuing said frames received for transmission in said plurality of buffers;
   multiplexing frames from the plurality of buffers corresponding to the plurality of local Fibre-Channel ports for transmission into a transport network from said buffers such that a combination of maximum data rates of Fibre-Channel links terminated by said plurality of local Fibre-Channel ports through said transport interface exceeds momentary bandwidth available on the transport network; and
   transmitting frames multiplexed from the plurality of buffers associated with the plurality of local Fibre-Channel ports via said transport network.

2. The method of claim 1 wherein multiplexing comprises employing a round robin method.

3. The method of claim 1 multiplexing comprises employing a deficit weighted round robin method.

4. The method of claim 1 further comprising:
   receiving, at said transport interface, a ready indication signal directed to a selected one of said plurality of local Fibre-Channel ports from a particular remote Fibre-Channel port;
   waiting for transmission of a frame from one of the plurality of buffers associated with the selected local Fibre-Channel port to which the ready indication signal is targeted; and
   thereafter, relaying said ready indication signal to said selected local Fibre-Channel port.

5. The method of claim 1 wherein said transport network comprises a wavelength of a DWDM link.

6. The method of claim 4, and further comprising storing data representing a credit value that represents a capacity of the particular remote Fiber-Channel port to receive a new frame from the selected local Fibre-Channel port, receiving an initial credit number value from the particular remote Fiber-Channel port upon establishing a link with the selected local Fibre-Channel port, decrementing the credit value upon a frame being sent from the buffer associated with the selected local Fibre-Channel port to the particular remote Fibre-Channel port, and incrementing the credit value in response to receiving the ready indication signal from the particular remote Fiber-Channel port.

7. The method of claim 6, wherein waiting and relaying are performed with respect to ready indication signals received from the particular remote Fibre-Channel port so that a maximum number of frames in the plurality of buffers is equal to the initial credit number value that was sent by the remote Fibre-Channel port.

8. An apparatus comprising:
   a plurality of buffers associated with a plurality of local Fibre-Channel ports, wherein frames output by said plurality of local Fibre-Channel ports are queued into corresponding ones of said plurality of buffers; and
   a selector that is configured to multiplex frames from the plurality of buffers corresponding to the plurality of local Fibre-Channel ports for transmission into a transport network such that a combination of maximum data rates of Fibre-Channel links terminated by said plurality of local Fibre-Channel ports through said transport interface exceeds momentary bandwidth available on the transport network.

9. The apparatus of claim 8 wherein said selector is configured to employ a round robin method when multiplexing frames from the plurality of buffers.

10. The apparatus of claim 8 wherein said selector is configured to employ a deficit weighted round robin method when multiplexing frames from the plurality of buffers.

11. The apparatus of claim 8 and further comprising a ready signal filter that is configured to receive a ready indication signal directed to a selected one of said plurality of local Fibre-Channel ports, waits for transmission of a frame from one of the plurality of buffers associated with the selected local Fibre-Channel port and thereafter relays said ready indication signal to said selected local Fibre-Channel port.

12. The apparatus of claim 11, wherein the selected local Fibre-Channel port is configured to store data representing a credit value that represents a capacity of a particular remote Fiber-Channel port to receive a new frame from the selected local Fibre-Channel port, receive an initial credit number value from the particular remote Fiber-Channel port upon establishing a link with the selected local Fibre-Channel port, decrement the credit value upon a frame being sent from the buffer associated with the selected local Fibre-Channel port to the particular remote Fibre-Channel port, and increment the credit value in response to receiving the ready indication signal from the particular remote Fiber-Channel port.

13. The apparatus of claim 12, wherein the ready signal filter is configured to wait and relay with respect to ready indication signals received from the particular remote Fibre-Channel port so that a maximum number of frames in the plurality of buffers is equal to the initial credit number value that was sent by the remote Fibre-Channel port.

* * * * *